(12) United States Patent
Boyer et al.

(10) Patent No.: US 7,869,026 B2
(45) Date of Patent: Jan. 11, 2011

(54) TARGETED ARTIFACTS AND METHODS FOR EVALUATING 3-D COORDINATE SYSTEM MEASUREMENT ACCURACY OF OPTICAL 3-D MEASURING SYSTEMS USING SUCH TARGETED ARTIFACTS

(75) Inventors: Jesse R. Boyer, Berlin, CT (US); Jeffry K. Pearson, Newport Beach, CA (US); Randall W. Joyner, Union, CT (US); Joseph D Drescher, Middletown, CT (US)

(73) Assignee: United Technologies Corp., Hartford, CT (US)

( * ) Notice: Subject to any disclaimer, the term of this patent is extended or adjusted under 35 U.S.C. 154(b) by 411 days.

(21) Appl. No.: 11/962,278

(22) Filed: Dec. 21, 2007

(65) Prior Publication Data

US 2009/0161122 A1 Jun. 25, 2009

(51) Int. Cl.
*G01J 1/10* (2006.01)
*G01B 11/14* (2006.01)
(52) U.S. Cl. .................. 356/243.1; 356/601; 356/620; 356/625; 702/152
(58) Field of Classification Search ............. 356/243.1, 356/601, 602, 614, 620, 625; 702/94, 104, 702/152
See application file for complete search history.

(56) References Cited

U.S. PATENT DOCUMENTS

| | | | |
|---|---|---|---|
| 5,540,505 A | 7/1996 | Struziak | |
| 5,748,505 A | 5/1998 | Greer | |
| 5,958,847 A | 9/1999 | Novak | |
| 6,078,846 A | 6/2000 | Greer et al. | |
| 6,165,542 A | 12/2000 | Jaworowski et al. | |
| 6,175,415 B1 | 1/2001 | Pietrzak et al. | |
| 6,205,240 B1 | 3/2001 | Pietrzak et al. | |
| 6,285,959 B1 | 9/2001 | Greer | |
| 6,704,102 B2 | 3/2004 | Roelke | |
| 6,822,748 B2* | 11/2004 | Johnston et al. | 356/608 |
| 6,836,323 B2* | 12/2004 | Schmadel | 356/243.1 |
| 6,944,564 B2 | 9/2005 | De Jonge et al. | |
| 6,977,356 B2 | 12/2005 | Vaidyanathan et al. | |
| 7,036,236 B1 | 5/2006 | Drescher et al. | |
| 7,084,386 B2* | 8/2006 | Bernardini et al. | 250/216 |
| 7,113,878 B1 | 9/2006 | Loferer et al. | |
| 7,180,607 B2 | 2/2007 | Kyle et al. | |
| 2005/0068523 A1* | 3/2005 | Wang et al. | 356/243.1 |
| 2008/0243416 A1* | 10/2008 | Bryll | 702/95 |
| 2009/0033926 A1* | 2/2009 | Haug | 356/243.1 |

* cited by examiner

*Primary Examiner*—L. G Lauchman

(57) ABSTRACT

A method for evaluating three-dimensional (3-D) coordinate system measurement accuracy of an optical 3-D measuring system using targeted artifacts is provided. In this regard, an exemplary embodiment of a method for evaluating 3-D coordinate system measurement accuracy using targeted artifacts comprises: taking a series of measurements from different positions and orientations using target dots on a targeted artifact with an optical 3-D measuring system; and calculating measurement errors using the series of measurements. An exemplary embodiment of a targeted artifact used with the method includes a base and target dots located on the base.

14 Claims, 4 Drawing Sheets

TARGETED ARTIFACTS AND METHODS FOR EVALUATING 3-D COORDINATE SYSTEM MEASUREMENT ACCURACY OF OPTICAL 3-D MEASURING SYSTEMS USING SUCH TARGETED ARTIFACTS

BACKGROUND

1. Technical Field

The present invention relates generally to optical 3-D measuring systems.

2. Description of the Related Art

Various methods exist for evaluating the measurement accuracy of optical 3-D measuring systems. For example, one prior art method teaches the use of dumbbell and parallel bar artifacts to evaluate the measurement accuracy of optical 3-D measuring systems. This method, however, does not allow one to evaluate if optical 3-D measuring systems are accurately creating 3-D coordinate systems or the measurement accuracy of these measuring systems with regard to these coordinate systems.

SUMMARY

Targeted artifacts and methods for evaluating the 3-D coordinate system measurement accuracy of optical 3-D measuring systems using targeted artifacts are provided. An exemplary embodiment of such a method comprises: taking a series of measurements from different positions and orientations using targets dots on a targeted artifact with an optical 3-D measuring system; and calculating measurement errors using the series of measurements.

An exemplary embodiment of a targeted artifact comprises: a base; and target dots located on the base.

Other methods, features and/or advantages of this disclosure will be or may become apparent to one with skill in the art upon examination of the following drawings and detailed description. It is intended that all such additional methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Targeted artifacts and methods for evaluating 3-D coordinate system measurement accuracy of optical 3-D measuring systems using targeted artifacts are provided. In this regard, optical 3-D measuring systems include fringe projection, moiré techniques, and photogrammetric or scanning systems with area-based measuring capabilities, such as the Advanced Topometric System or ATOS.

By way of example, an exemplary embodiment involves taking a series of measurements using target dots on a targeted artifact with an optical 3-D measuring system located in multiple different positions and then calculating 3-D coordinate system linear and spatial measurement errors using these measurements. The target dots create a 3-D coordinate system and the measurements taken using these dots allow the 3-D coordinate system measurement accuracy of the 3-D measuring system to be evaluated. More specifically, the target dots and measurements allow one to evaluate if the measuring system is repeatably creating the 3-D coordinate system formed by the target dots and doing so from various positions.

Figure 1:
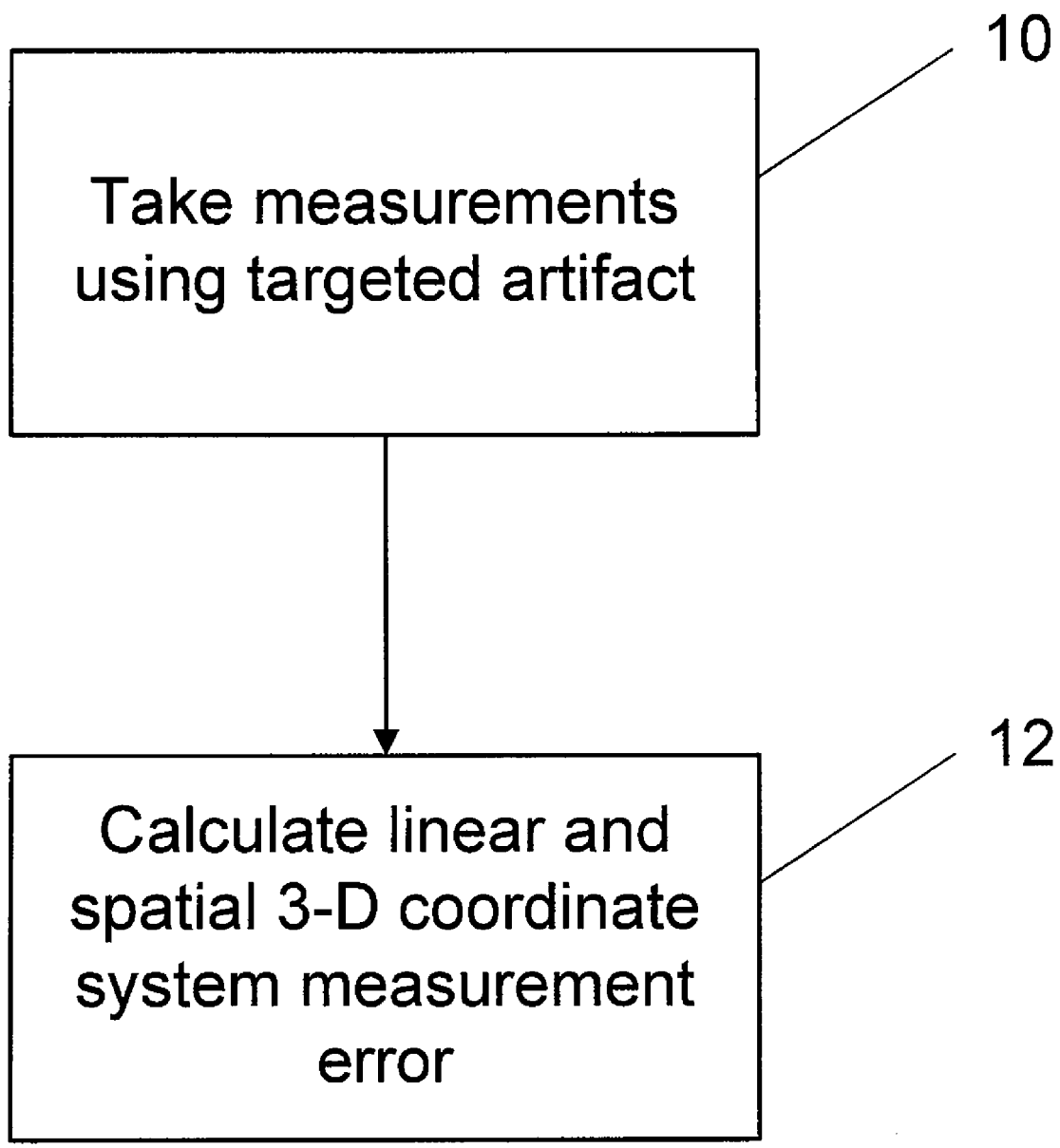
FIG. 1 is a flow chart showing the steps included in an exemplary embodiment of a method for evaluating 3-D coordinate system measurement accuracy of optical 3-D measuring systems using targeted artifacts.

In this regard, reference is made to FIG. 1, which is a flow chart showing the steps included in an exemplary embodiment of a method for evaluating 3-D coordinate system measurement accuracy of optical 3-D measuring systems using targeted artifacts. As shown in FIG. 1, the method includes the steps of taking a series of measurements using targets dots on a targeted artifact with an optical 3-D measuring system located in multiple different positions (block 10) and then calculating linear and spatial 3-D coordinate system measurement errors using these measurements (block 12).

The measurements should be taken with the 3-D measuring system first positioned and oriented as it would be when performing the setup calibration for the measuring system (the home position). A predetermined number of three-dimensional length measurements using the target dots should be measured and recorded with the measuring system in this first position. For example, in one exemplary embodiment, at least 10 different three-dimensional length measurements using at least 5 target dots are measured and recorded with the measuring system in this first position.

The 3-D measuring system should then be moved to a predetermined number of different positions and orientations, with the process of measuring and recording the predetermined number of three-dimensional length measurements repeated at each of these positions. The positions and orientations used for these measurements should cover the ranges used by the measuring system during normal operation. In the exemplary embodiment discussed in the preceding paragraph, the 3-D measuring system is moved to a minimum of four different positions and orientations, with the process of measuring and recording at least 10 different three-dimensional length measurements repeated at each of these positions.

The 3-D measuring system should then be returned to the original ("home") position and the three-dimensional length measurements previously made in this position and orientation should be remeasured and recorded. For each length and position, the maximum, absolute value difference between the measured length and the measured value of the same length at the home position should be recorded.

The linear coordinate system measurement error is defined as the greatest, absolute value difference for any measured length. The spatial coordinate system measurement error is defined as the greatest, absolute value difference of any coordinate system created from the target dots with respect to the coordinate system created at the home position.

Methods, such as the exemplary method for evaluating the 3-D coordinate system measurement accuracy of optical 3-D measuring systems using targeted artifacts described above, may be used in connection with other prior art methods for evaluating the measurement accuracy of optical 3-D measuring systems. For example, such a method can be use in connection with the prior art method described in VDI/VDE standard 2634—Part 2. This standard is well known in the art and is described in a document entitled "Optical 3-D Measuring Systems, Optical Systems Based on Area Scanning, VDI/VDE 2634, Part 2", which is incorporated by referenced into this application. One of the potential advantages of some embodiments over this prior art method is that the targeted artifacts do not need to be calibrated, unlike the dumbbell and parallel bar artifacts used in the prior art method.

The targeted artifacts used in some embodiments should include bases sized so that the target dots on the bases are well distributed within the volumes to be measured at various positions and angles. The artifacts should also be constructed to facilitate the measurement of a minimum predetermined number of three-dimensional lengths between target dots within the volumes to be measured. For example, in one exemplary embodiment, the targeted artifact is constructed to facilitate the measurement of a minimum of ten three-dimensional lengths. The target dots should also be visible from various possible viewing angles of the 3-D measuring systems.

Figure 2:
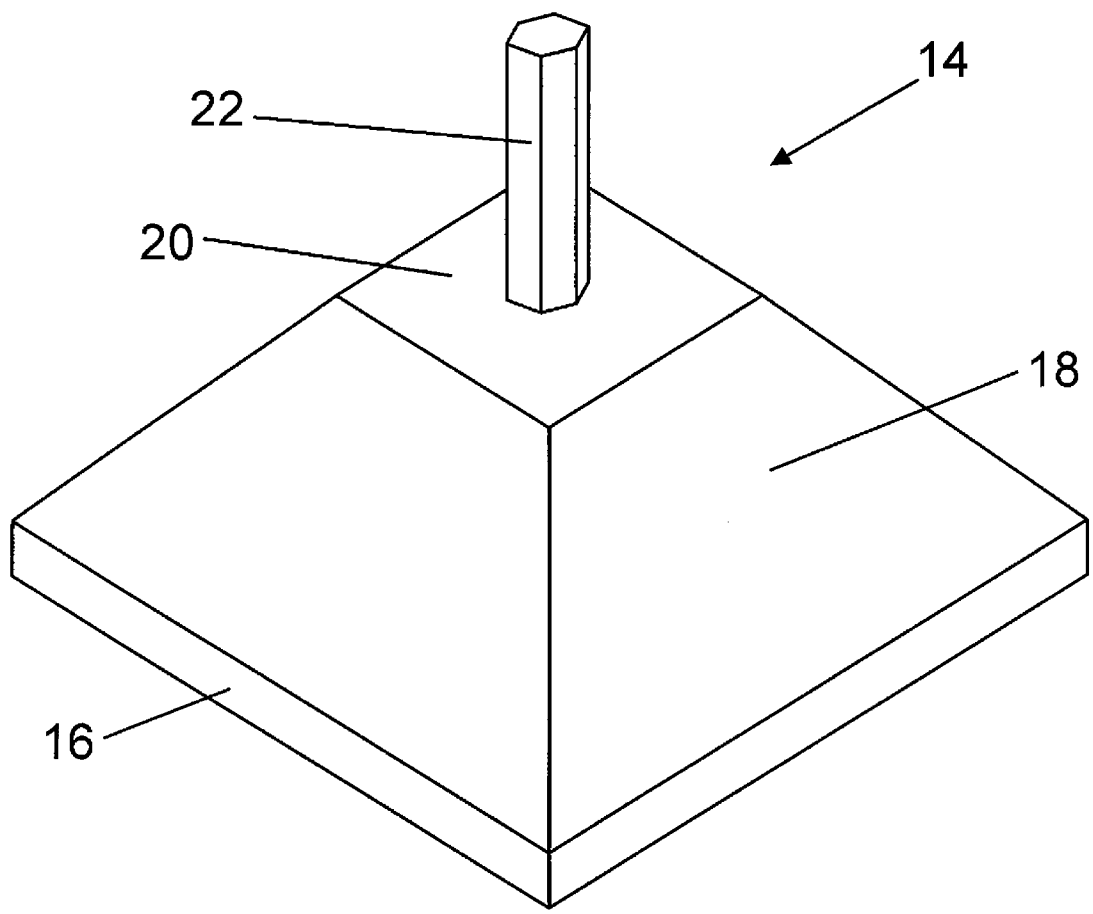
FIG. 2 is a perspective view showing an exemplary embodiment of a targeted artifact base.
Figure 3:
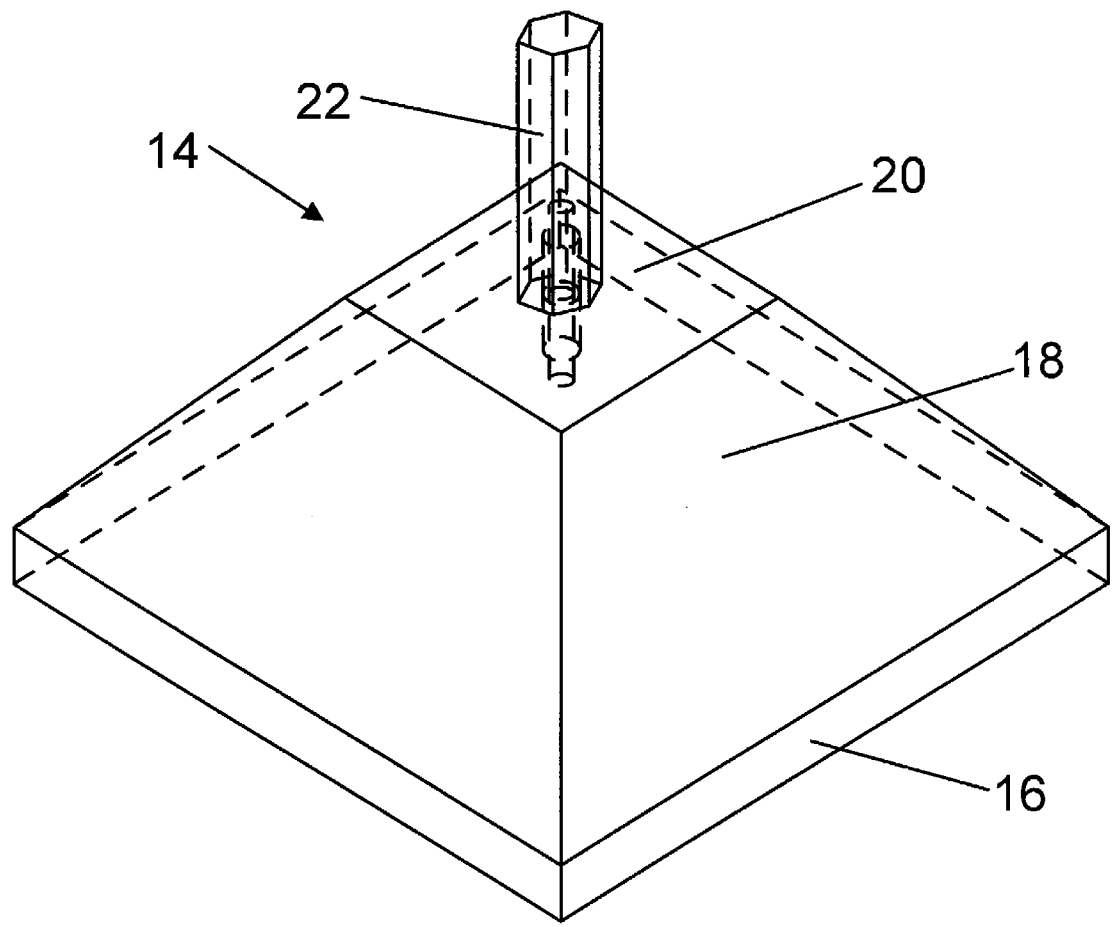
FIG. 3 is a hidden line view of the targeted artifact base shown in FIG. 2.
Figure 4:
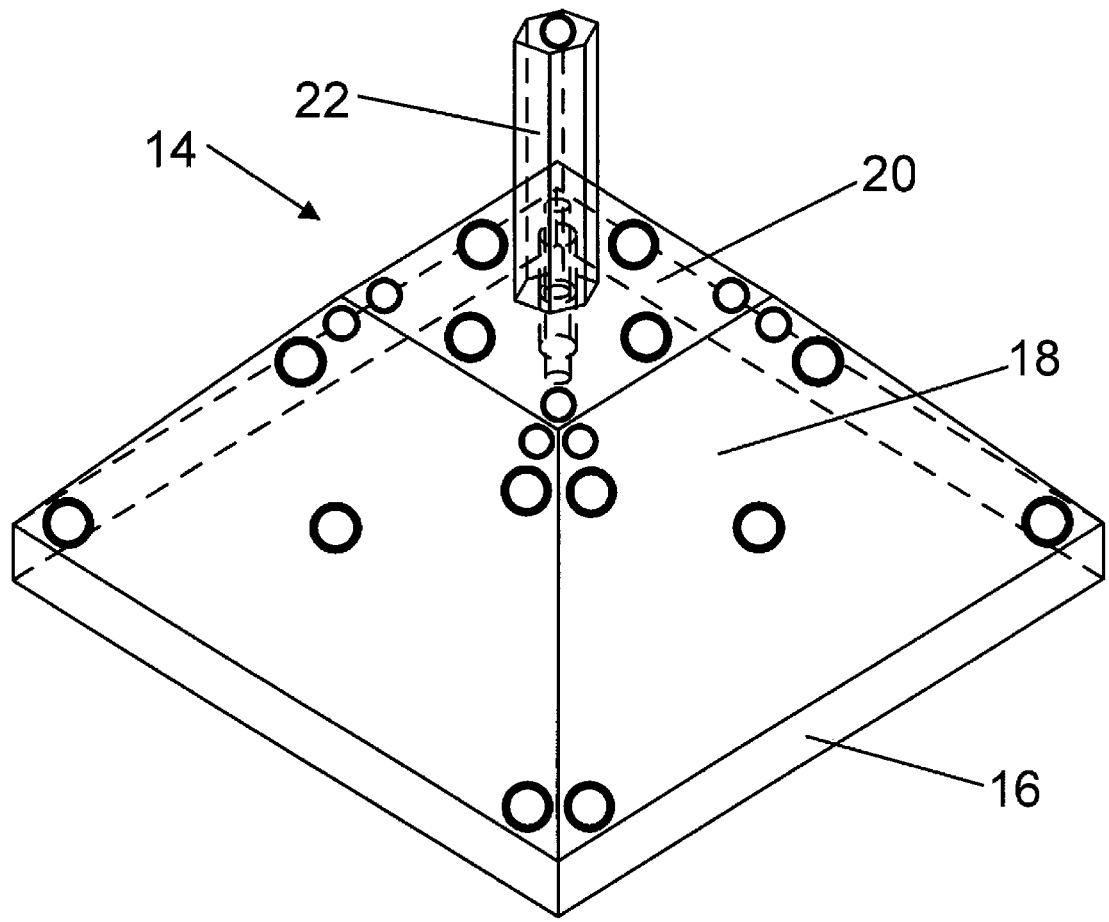
FIG. 4 is a hidden line view showing target dots on the targeted artifact base shown in FIG. 2.

An exemplary embodiment of a targeted artifact 14 that can be used with the method described above with respect to FIG. 1 is shown schematically in FIGS. 2-4. As shown in FIG. 2 and FIG. 3, artifact 14 has a pyramidal shape, four vertical surfaces (e.g., surface 16), four sloped surfaces (e.g., surface 18), and a flat upper surface 20. Artifact 14 also includes an interchangeable post 22 connected to upper surface 20 that can be used to accommodate various measuring volumes.

Multiple target dots, 24 and 26, are located at various positions on sloped surfaces 18, flat surface 20, and post 22 (see FIG. 4). Note that in this embodiment, target dots 24 are slightly larger than target dots 26. Smaller target dots 26 are used with smaller measuring volumes and larger target dots 24 are used with larger measuring volumes.

Although the embodiment shown in FIG. 4 includes specific numbers of large and small target dots on sloped surfaces 18, flat surface 20, and post 22, in other embodiments, other numbers and configurations of target dots can be used.

The above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A method for evaluating three-dimensional (3-D) coordinate system measurement accuracy of an optical 3-D measuring system using targeted artifacts, comprising the steps of:
    taking a series of measurements from different positions and orientations using target dots on a targeted artifact with an optical 3-D measuring system; and
    calculating measurement errors using the series of measurements;
    wherein taking a series of measurements comprises:
        determining, at a home position, a predetermined number of different 3-D length measurements using the target dots; and
        recording the predetermined number of different 3-D length measurements.

2. The method of claim 1, wherein the positions and orientations cover a range of positions and orientations used by the optical 3-D measuring system during normal operation.

3. The method of claim 1, wherein calculating measurement errors comprises calculating linear and spatial 3-D coordinate system measurement errors.

4. The method of claim 1, wherein taking a series of measurements further comprises:
    moving the optical 3-D measuring system from the home position to a predetermined number of different positions and orientations; and
    determining, at each of the predetermined number of different positions, a predetermined number of different 3-D length measurements using the target dots.

5. The method of claim 4, wherein taking a series of measurements further comprises:
    returning the optical 3-D measuring system to the home position; and
    re-measuring the different three-dimensional length measurements previously measured by the optical 3-D measuring system at the home position.

6. A method for evaluating three-dimensional (3-D) coordinate system measurement accuracy of an optical 3-D measuring system using targeted artifacts, comprising the steps of:
    taking a series of measurements from different positions and orientations using target dots on a targeted artifact with an optical 3-D measuring system; and
    calculating measurement errors using the series of measurements;
    wherein calculating measurement errors comprises:
        calculating a maximum, linear, absolute value difference between each length measured at a home position and each corresponding length measured at the predetermined number of different positions and orientations.

7. The method of claim 6, wherein calculating measurement errors further comprises:
    identifying the maximum, linear, absolute value difference that is greater than any of the other maximum, linear, absolute value differences to identify a greatest, linear, absolute value difference; and
    using the identified greatest, linear, absolute value difference as the linear 3-D coordinate system measurement error.

8. A method for evaluating three-dimensional (3-D) coordinate system measurement accuracy of an optical 3-D measuring system using targeted artifacts, comprising the steps of:
    taking a series of measurements from different positions and orientations using target dots on a targeted artifact with an optical 3-D measuring system; and
    calculating measurement errors using the series of measurements;
    wherein calculating measurement errors comprises:
        calculating a maximum, spatial, absolute value difference between a 3-D coordinate system created by the target dots at a home position and each 3-D coordinate system created by the target dots at the predetermined number of different positions and orientations.

9. The method of claim 8, wherein calculating measurement errors further comprises:
    identifying the maximum, spatial, absolute value difference that is greater than any of the calculated maximum, spatial, absolute value differences to obtain a greatest, spatial, absolute value difference; and
    using the greatest, spatial, absolute value difference as the spatial 3-D coordinate system measurement error.

10. A method for evaluating three-dimensional (3-D) coordinate system measurement accuracy of an optical 3-D measuring system using targeted artifacts, comprising:
- measuring distances between multiple target dots on a targeted artifact with an optical 3-D measuring system positioned at a first location and a first orientation;
- altering at least one of the location and the orientation of the optical 3-D measuring system;
- repositioning the optical 3-D measuring system to the first location and the first orientation;
- re-measuring distances between the multiple target dots with the optical 3-D measuring system positioned at the first location and the first orientation; and
- calculating measurement errors using the distances measured.

11. The method of claim 10, wherein measuring distances comprises measuring three-dimensional distances.

12. The method of claim 10, wherein calculating measurement errors comprises calculating linear 3-D coordinate system measurement errors.

13. The method of claim 10, wherein calculating measurement errors comprises calculating spatial 3-D coordinate system measurement errors.

14. The method of claim 10, wherein calculating measurement errors comprises calculating whether the optical 3-D measuring system is repeatably creating a 3-D coordinate system formed by the target dots.

* * * * *